March 2, 1943.  A. R. PEZZILLO  2,312,848
MOTOR DRIVEN PUMP UNIT
Filed Jan. 7, 1941  2 Sheets-Sheet 1

INVENTOR
Albert R. Pezzillo
BY
Herbert S. Fairbanks
ATTORNEY

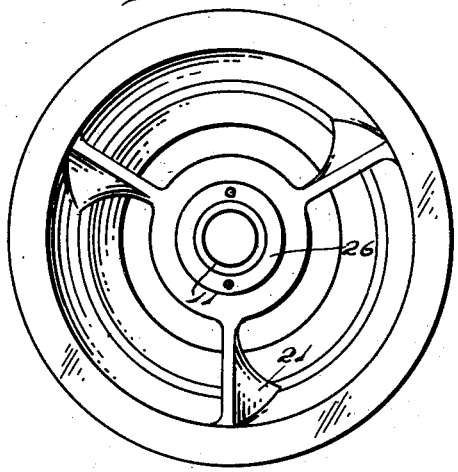
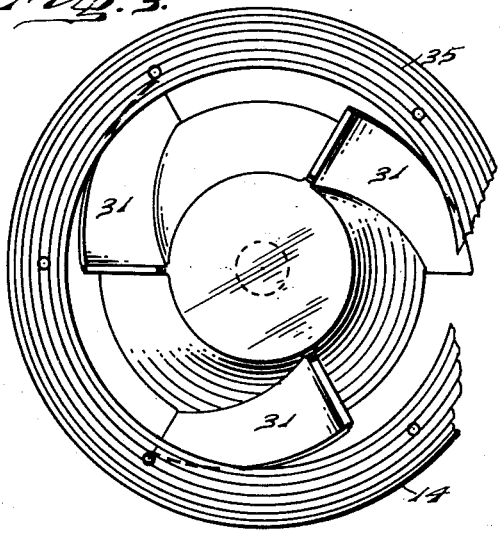
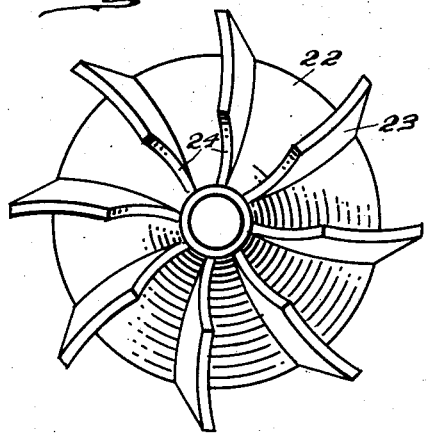
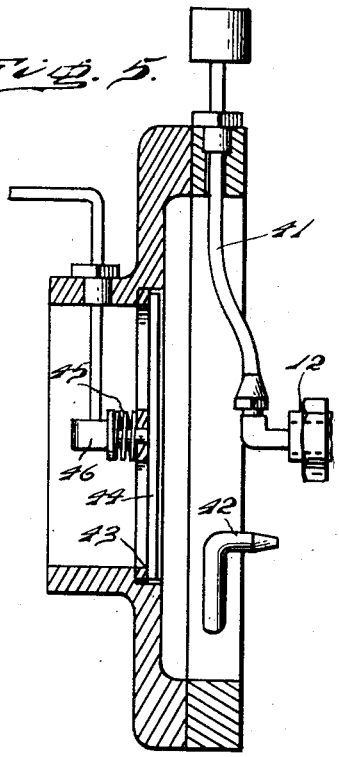
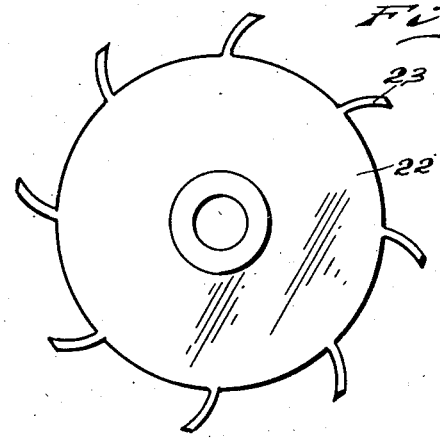

Patented Mar. 2, 1943

2,312,848

UNITED STATES PATENT OFFICE 2,312,848

MOTOR DRIVEN PUMP UNIT

Albert R. Pezzillo, Philadelphia, Pa.

Application January 7, 1941, Serial No. 373,419

12 Claims. (Cl. 103—87)

The primary object of my present invention is to devise a novel motor driven pump unit which will give maximum efficiency in operation.

In order to attain this result, a novel rotor has been designed through which the fluid is impelled, due to an impeller at the intake end feeding the fluid in a stream gradually decreasing in diameter to the intake end of a novel impeller, which latter causes the fluid stream to gradually increase in diameter towards the outlet to increase the centrifugal force of the fluid. The bore of the rotor tapers inwardly from each end towards the central portion of the rotor. The impellers are carried by the rotor to revolve in unison therewith, and have their blades shaped to create a desired pressure on the fluid. The rotor is assembled in a novel manner, and is preferably supported within the stator by resilient members which have several additional functions. These resilient supporting members serve to isolate the stator windings from the fluid being circulated, reduce vibration, and also serve as sound deadeners. The resilient members are supported in a manner to ensure against stretching, creeping and pulling, and to effectively prevent leakage. A cylinder, non-magnetic and having high electrical resistance qualities, is sealed in a novel manner with end members to prevent leakage.

A starting relay and overload cut-out are carried by the cover of a casing on the housing, so that, on the removal of the cover, the parts of the relay are exposed for inspection and repair, and the stator windings can also be inspected. The housing and its end members are so designed that, when connected in a pipe line, sufficient strength and stability are provided against strains to which they are subjected. A further object of the invention is to so shape the fluid contacting surfaces that there will be a stream line flow of the fluid through the motor driven pump unit.

With the foregoing and other objects in view as will hereinafter more clearly appear in the detailed description and the appended claims, my invention comprehends a novel motor driven pump unit.

It further comprehends a novel rotor having novel impellers, assembled in a novel manner with the rotor to form a unit of construction. It further comprehends a novel housing, and a novel resilient support for the rotor and its adjuncts.

Other novel features of construction and advantage will hereinafter appear.

For the purpose of illustrating the invention, I have shown in the accompanying drawings typical embodiments of it, which, in practice, will give satisfactory and reliable results. It is, however, to be understood that the various instrumentalities of which my invention consists can be variously arranged and organized and my invention is not limited to the exact arrangement and organization of these instrumentalities as herein set forth.

Figure 2 is an end elevation of the rotor unit at the intake end.

Figure 3 is an end elevation of the bearing at the outlet end.

Figure 4 is an end elevation of the impeller at the outlet end.

Figure 5 is a sectional elevation of another embodiment of the invention.

Figure 6 is an end elevation of the impeller at the outlet end of the rotor.

Similar numerals of reference indicate corresponding parts.

Figure 1:
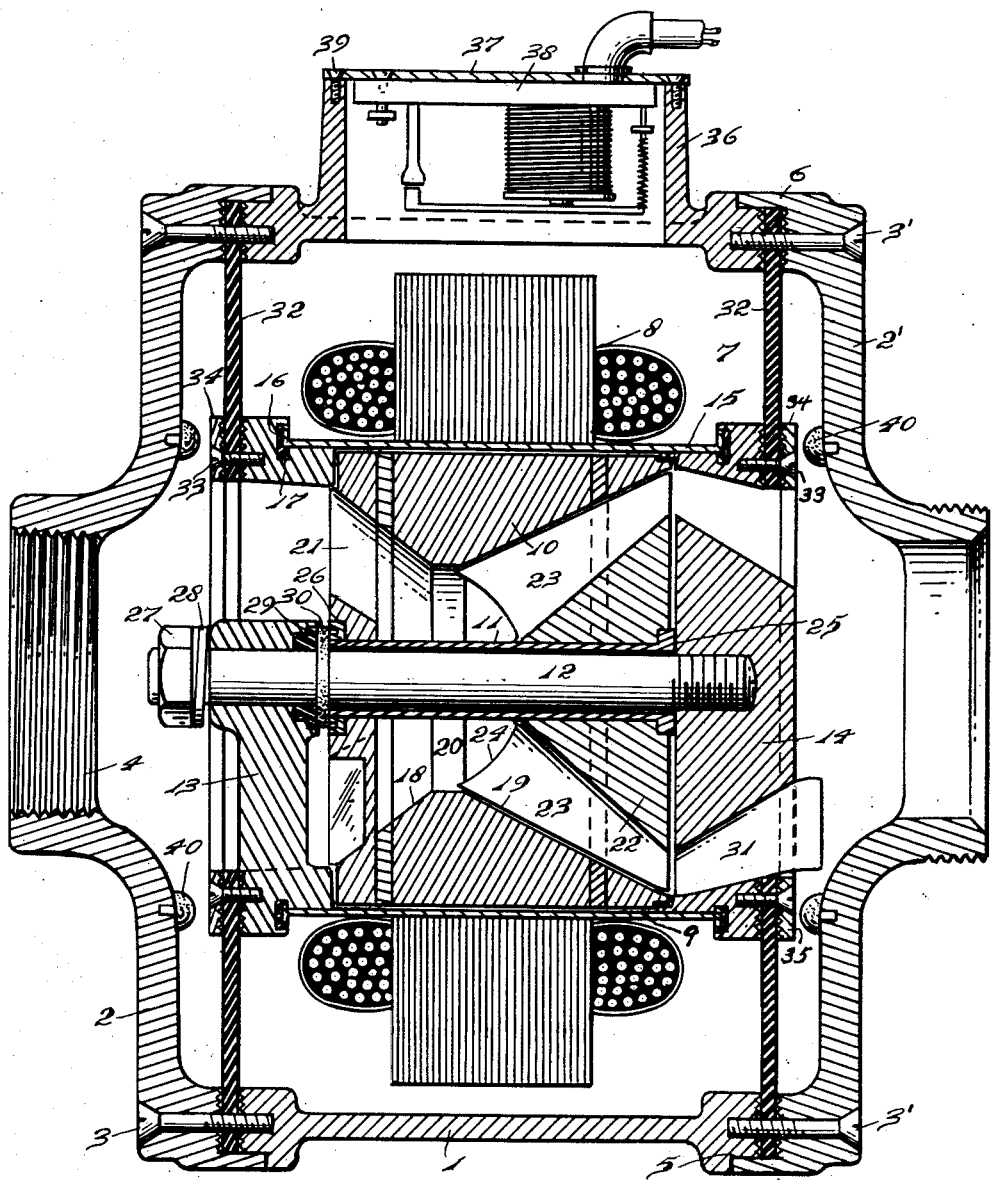
Figure 1 is a sectional elevation of a motor driven pump unit, embodying my invention.

Referring to the drawings:

1 designates an outer casing of a motor driven pump unit embodying my invention. The casing 1 has an end member 2 connected with it at the intake end by fastening devices 3 and is internally threaded, as at 4, to receive a pipe line. The casing 1 has at the discharge end an end member 2' secured to it by fastening devices 3' and is threaded to adapt it to receive a union to connect it in a pipe line. The casing 1 is recessed at the ends, as at 5, to receive overhanging flanges 6 of the end members. The outer casing and end members 2 and 3 form a housing.

The housing has within it a stator chamber 7 with stator windings 8, and a rotor chamber 9 in which a rotor 10 is located. The rotor 10 is mounted on a sleeve bearing 11 on a shaft 12 mounted in end bearings 13 and 14.

The stator and rotor chambers are separated from each other by an inner cylinder 15 of non-magnetic material but having high electrical resistance characteristics. The end bearings have annular grooves 16 containing a resilient gasket 17 and the ends of the cylinder 15 are deflected outwardly and are sealed against the gasket 17, when the rotor unit is assembled as hereinafter explained.

The rotor 10 is tubular, and its bore converges inwardly from each end, as at 18 and 19, towards its central portion 20.

The intake end of the rotor has impeller blades 21 forming an impeller at the intake end of the rotor. An impeller 22 is mounted on the sleeve bearing 11 and has helical blades 23 having their outer faces tapering from the outlet end towards the central portion of the bore of the rotor, so as to have a working fit in the portion 19 of progressively increasing diameter. The blades 23 project outwardly from a cone shaped body portion of the impeller 22, extending beyond the inner portion of the cone and at the outlet end they project outwardly from the cone but not beyond it in a longitudinal direction. The blades have their outer faces bevelled and their inner ends are curved as at 24. The impeller at the outlet end is recessed to receive a flange 25 of the sleeve bearing 11 and the impeller at the intake end is recessed to receive a nut 26 in threaded engagement with the sleeve bearing 11, thus maintaining the assembly of the rotor unit.

The rotor and end bearings are retained in assembled condition by the shaft 12 which at the outlet end is threaded into the end bearing 14, and, at the intake end, the shaft has a nut 27 and a spring washer 28 bearing against the end bearing 13. The spring washer provides for a slight longitudinal movement of the rotor. The end bearing 13 is recessed to receive a resilient washer 29 which bears against a carbon ring 30.

The end bearing 14 has spaced curved blades 31 which are straight at the outlet end and extend longitudinally beyond the end bearing to cause a straight flow of the fluid through the outlet.

The end bearings are resiliently supported by discs or rings 32 preferably of rubber or reinforced rubber, secured to the end bearings by fastening devices 33 and rings 34, the latter having an irregular or dented surface to contact the rubber. The resilient discs or rings 32 at their outer peripheries are secured by the fastening devices 3 between the housing and its end members, the metal surfaces on opposite sides of the resilient rings being indented, or having raised portions. The indentations may be in the form of annular, raised ribs 35 as in Figure 3.

The housing 1 has an upwardly projected portion 36 forming with a cover 37 a casing for a starting relay and overload cut-out 38, carried by the cover 37. The cover 37 is retained in position by screws 39 and when such screws are removed, the relay and the stator windings are exposed for inspection. The end housing members 2 carry rubber bumpers 40 which may at times carry the weight of the rotor unit when the motor driven pump unit is installed in a vertical position, and which prevent metal to metal contact when the motor driven pump unit is installed in a horizontal position.

In Figure 5, I have shown an end member of the housing having a flexible pipe 41 leading from a source of lubricant supply to the shaft 12, which, in this case, would be tubular and having ports leading to the bearing sleeve of the rotor. A pipe 42 provides for the introduction of a fluid independently of the fluid in the pipe line.

If desired, the housing end member at the intake end may be provided with a valve seat 43 controlled by a valve 44 having a spring 45 tending to close the valve, and having a manually controlled cam 46 to effect the opening of the valve, when desired.

The fluid passages in the impellers and the end bearings are stream lined with no obstructions to retard the flow of the fluid, and the blades of the end bearing 14 are straight at their discharge ends to cause a straight line flow through the outlet from the housing.

The rotor and the impellers 21 and 22 are secured in assembled condition by the bearing sleeve and its nut, so that such parts revolve as a unit of construction. The intake passages in the impeller 21 converge forwardly to register with the forwardly converging passages in the rotor, which lead to the forwardly diverging passages formed between the impeller 22 and the bore of the rotor. The end member 14 has forwardly converging passages with blades which cause a straight line flow at the delivery end of the pump unit.

When the stator is energized, the rotor and impellers revolve as a unit, and the impeller 21 draws in fluid from the pump intake and causes it to flow through the forwardly converging passages in the rotor. The blades 23 cause the fluid to flow without back pressure in forwardly diverging tapered paths. The passages in the end member 14 cause the fluid to have a converging path towards the pump outlet, and the blades 31 cause a straight line flow through the pump outlet. This construction and arrangement provides a very efficient pumping action.

Having thus described my invention, what I claim as new and desire to secure by Letters Patent is:

1. In a motor driven pump unit, a housing having an inlet and an outlet, a stator, a tubular rotor within the stator, end bearings for the rotor, a cylinder between the stator and rotor and between the end bearings, an impeller carried by the rotor, means to resiliently support said rotor from said housing, and means to prevent metal to metal contact between said end members and housing.

2. In a motor driven pump unit, a housing having end members for connection in a pipe line, a stator within the housing, end bearings, a cylinder sealed with the bearings to contribute to form a stator chamber and a rotor chamber, a rotor in the rotor chamber having impellers at its inlet and outlet ends, rubber rings connected with the end bearings and secured at their outer portions between the housing and its end members, the contacting faces of the housing and its end members having raised surfaces to contact the rubber rings to prevent their creeping or stretching.

3. In a motor driven pump unit, a rotor assembly comprising a tubular rotor, a sleeve bearing for the rotor, an impeller at the outlet end of the rotor, end bearings, a shaft passing through said sleeve bearing and connected with one end bearing, and means including a nut on the shaft and a spring washer bearing against the other of said end bearings to maintain the end bearings, rotor end impellers in assembled condition.

4. In a motor driven pump unit, a housing having an inlet and an outlet, a stator unit, a tubular rotor within the stator and having impellers at each end, means to resiliently support said stator unit within the housing, and means to prevent metal to metal contact between the housing and stator unit.

5. In a motor driven pump unit, a housing having raised surfaces, a stator unit having rubber discs, and end members with raised surfaces, means to compress said rubber discs against the raised surfaces of said housing and stator end members to support the stator unit and to prevent creeping or stretching of the rubber at points of attachment.

6. A tubular rotor forming part of an electric motor, having its bore converging forwardly from its intake end and then diverging forwardly towards its discharge end, an impeller at the intake end with blades converging forwardly, an impeller within the rotor at the discharge end and having a body portion with an unapertured central portion, rearwardly coned, and forming with the forwardly diverging bore of the rotor a forwardly diverging passage, and having circumferentially spaced blades, and means to retain said impellers and rotor in assembled condition to revolve as a unit.

7. A tubular rotor forming part of an electric motor, having its bore converging forwardly from its intake end and then diverging forwardly towards its discharge end, an impeller at the intake end with blades converging forwardly, an impeller within the rotor at the discharge end and having a body portion with an unapertured central portion, rearwardly coned, and forming with the rotor a forwardly diverging passage and having blades carried by the coned portion and progressively decreasing in radial depth from their intake ends to their discharge ends, and means to secure together the impellers and rotor.

8. A tubular rotor forming part of an electric motor, having its bore converging forwardly from its intake end, then diverging forwardly towards its discharge end, an impeller at the intake end with blades converging forwardly, an impeller within the rotor at the discharge end and having a rearwardly extending, coned body portion forming with the rotor a forwardly diverging passage and having blades, a sleeve bearing on which said rotor and impellers are mounted, and a shaft supporting said sleeve bearing.

9. A tubular rotor forming part of an electric motor, having its bore converging forwardly from its intake end and then diverging forwardly towards its discharge end, an impeller at the intake end with blades converging forwardly, an impeller within the rotor at the discharge end and forming with the bore of the rotor a forwardly diverging passage, a sleeve bearing on which the rotor and impellers are mounted as a unit, end members outboard of the sleeve bearing, and a supporting shaft passing through said sleeve bearing and secured with respect to said end members.

10. A tubular rotor forming part of an electric motor, having its bore converging from its intake end and then diverging forwardly towards its discharge end, an impeller at the intake end, an impeller within the rotor at the discharge end, a sleeve bearing on which the rotor and impellers are mounted as a unit, a shaft passing through said sleeve bearing, end members to one of which said shaft is fixed, a nut at the opposite end of said shaft, and a spring washer between said nut and the juxtaposed end member.

11. A tubular rotor forming part of an electric motor, having its bore converging forwardly from its intake portion and then diverging forwardly towards its outlet, an impeller at the intake end, an impeller within the rotor at the discharge end, a sleeve bearing on which the impellers and rotor are mounted and having a shoulder at one end bearing against one impeller, and having a nut at its other end bearing against the other impeller to retain the impellers and rotor in assembled condition as a unit.

12. In a device of the character stated, a housing having a central portion and end members forming an inlet and an outlet, the central portion and end members having juxtaposed irregular surfaces; resilient rings having their outer portions clamped between said surfaces, a stator having ported end members and a cylinder between them, with the stator carried by such cylinder, clamping rings for the stator end members, said clamping rings and stator end members having juxtaposed irregular surfaces, and means to clamp the inner portions of said resilient rings between the irregular surfaces of the stator clamping rings and end members.

ALBERT R. PEZZILLO.